United States Patent [19]

McGuire

[11] Patent Number: 6,131,039

[45] Date of Patent: Oct. 10, 2000

[54] METHOD AND SYSTEM FOR WIRELESS TELECOMMUNICATIONS

[75] Inventor: Robert J. McGuire, Dallas, Tex.

[73] Assignee: Alcatel USA, Plano, Tex.

[21] Appl. No.: 09/045,470

[22] Filed: Mar. 20, 1998

[51] Int. Cl.[7] .................................................. H04Q 7/20

[52] U.S. Cl. ........................ 455/522; 455/450; 455/524

[58] Field of Search ................................. 455/522, 450, 455/452–413, 517, 506, 524, 423–424, 63, 67.1, 67.3

[56] References Cited

U.S. PATENT DOCUMENTS

| | | | |
|---|---|---|---|
| 5,327,576 | 7/1994 | Uddenfeldt et al. | 455/436 |
| 5,475,868 | 12/1995 | Duque-Anton et al. | 455/62 |
| 5,548,812 | 8/1996 | Padovani et al. | 455/453 X |
| 5,579,306 | 11/1996 | Dent | 455/522 X |
| 5,697,059 | 12/1997 | Carney | 455/524 X |
| 5,729,531 | 3/1998 | Raith et al. | 370/252 |
| 5,732,353 | 3/1998 | Haartsen | 455/450 |
| 5,809,423 | 9/1998 | Benveniste | 455/452 |
| 5,914,947 | 6/1999 | Saito | 370/337 |
| 5,943,610 | 8/1999 | Enso | 455/69 |
| 6,023,621 | 2/2000 | Jackson et al. | 455/452 |

FOREIGN PATENT DOCUMENTS

| | | | |
|---|---|---|---|
| WO 95/31879 | 11/1995 | WIPO | H04Q 7/22 |
| WO 96/10305 | 4/1996 | WIPO | H04J 3/16 |
| WO 96/27959 | 9/1996 | WIPO | H04J 3/16 |
| WO 98/03030 | 1/1998 | WIPO | H04Q 7/38 |

OTHER PUBLICATIONS

PCT International Search Report for International App. No. PCT/US 99/06021.

Epstein, et. al. "Reservation Strategies for Multi–Media Traffic in a Wireless Environment", Proceedings of the Vehicular Technology Conference, Chicago, Jul. 25–28, 1995, vol. 1, No. Conf. 45, pp. 165–169 (Jul. 25, 1995).

Iera, et. al. "Multimedia Services Management in Next Generation Mobile Networks", *1995 Fourth IEEE International Conference on Universal Personal Communications Record, Gateway to the 21*$^{st}$ *Century Tokyo*, Nov. 6–10, 1995, No. Conf. 4, pp. 687–691 (Nov. 6, 1995).

*Primary Examiner*—William G. Trost
*Attorney, Agent, or Firm*—Baker & McKenzie

[57] ABSTRACT

A method for transmitting data is provided. The method includes receiving a service request for a standby subscriber terminal, such as when a call is placed to or from the standby subscriber terminal. The number of telecommunications channels carried by a trunk group is then changed, such as by increasing or decreasing the number of encoded telecommunications channels carried by the trunk group. The standby subscriber terminal is then assigned to one of the telecommunications channels of the trunk group.

21 Claims, 4 Drawing Sheets

METHOD AND SYSTEM FOR WIRELESS TELECOMMUNICATIONS

FIELD OF THE INVENTION

This present invention relates in general to telecommunications systems and more particularly to a method and system for wireless data communications, including a system for dynamically allocating data channels to trunk groups.

BACKGROUND

Wireless communications systems use electromagnetic radiation to carry encoded data between a transmitter and a receiver. In wireless communication systems that include a central terminal that services a large number of subscriber terminals, each with the capability to receive and transmit data, it is necessary to efficiently use the electromagnetic frequency spectrum to accommodate the largest number of subscribers.

For example, a wireless local loop system may be used to provide service to residential areas. Such environments are typically multi-path environments, which are characterized by radio frequency signals being reflected by intervening objects, such that a large number of duplicate signals may be received at the receiver. In such environments, it is necessary to perform additional signal processing to improve the quality of the received signal.

In addition to the phenomenon of multi-path signal generation, radio frequency licensing entities often allocate available radio frequency spectrum space to telecommunications service providers in segments of varying bandwidth size. The number of users of the system also varies as a function of time, which can cause the signal quality to subscriber terminals that are remote from the central terminal to be degraded even though additional unused system capacity exists that could be used to improve the signal quality. Existing systems and methods for data communications that are used in multi-path environments are not easily reconfigured to accommodate changes in bandwidth, signal strength, number of users, or other variables. Therefore, it is difficult to optimize the data communication systems for the service environment, number of users, licensing variables, and other variables.

SUMMARY OF THE INVENTION

Therefore, a system and method for wireless data communications are required that substantially eliminate or reduce the problems associated with conventional systems and methods for wireless data communications.

In particular, a system method for wireless data communications is required that allows the signal strength to users that are remote from the central terminal to be improved when additional system resources are available.

In accordance with the present invention, a method is provided for transmitting data. The method includes receiving a service request for a standby subscriber terminal, such as when a call is placed to or from the standby subscriber terminal. The number of telecommunications channels carried by a trunk group is then changed, such as by increasing or decreasing the number of encoded telecommunications channels carried by the trunk group. The standby subscriber terminal is then assigned to one of the telecommunications channels of the trunk group.

Another embodiment of the present invention is a system for transmitting data. The system includes a central terminal coupled to a telecommunications network. The central terminal transmits and receives channels of data from the telecommunications network. The system also includes a plurality of subscriber terminals. Each subscriber terminal is operable to transmit and receive a channel of data from the central terminal. A trunk group having an effective radiated power level is modulated by a first group of one or more data channels. The effective radiated power level may be increased or decreased as a function of the distance between one or more subscriber terminals and the central terminal. Another trunk group is modulated by another one or more data channels. The effective radiated power level of the other trunk group may be increased or decreased as a function of the distance between the other group of one or more subscriber terminals and the central terminal.

The present invention provides many important technical advantages. One important technical advantage of the present invention is a method for improving the quality of data communications that allows the number of telecommunications channels carried by a trunk group to be dynamically increased and decreased. This dynamic assignment allows signal quality to be improved when system usage is light.

Another important technical advantage of the present invention is a system for transmitting data that allows the amplification power levels of trunk groups to be dynamically assigned. Dynamic assignment of power levels between trunk groups allows power to be reassigned from trunk groups that are servicing subscriber terminals that are near to the central terminal to trunk groups that are servicing subscriber terminals that are remote from the central terminal. Thus, the signal quality may be improved for one channel without adversely affecting the signal quality of other channels.

BRIEF DESCRIPTION OF THE DRAWINGS

An embodiment of the invention will be described hereinafter, by way of example only, with reference to accompanying drawings in which like reference numbers are used for like features and in which.

DETAILED DESCRIPTION OF THE DRAWINGS

Figure 1:
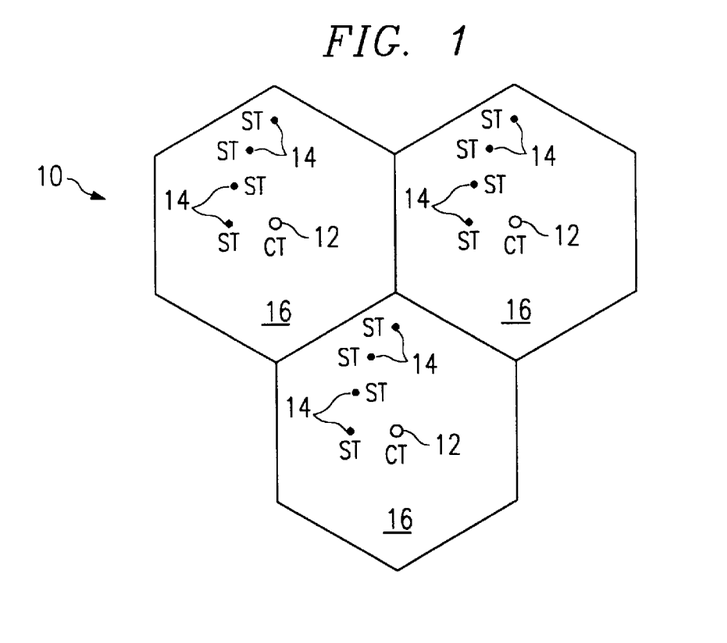
FIG. 1 is a diagram showing a wireless data communications system in accordance with one embodiment of the present invention.

FIG. 1 is a diagram of a wireless data communications system 10 in accordance with one embodiment of the present invention. System 10 includes central terminals 12, subscriber terminals 14, and service cells 16. Central terminals 12 communicate by radio frequency electromagnetic radiation with subscriber terminals 14. Each central terminal 12 and subscriber terminal 14 is associated with a service cell 16.

The effective radiated power from each subscriber terminal 14 is controlled via feedback from the associated central terminal 12 so as to maintain the power level of the signal received at the corresponding central terminal 12 at a predetermined level, such as –90 decibels below 1 milliwatt (dBm). Thus, the power level at each subscriber terminal 14 is a function of the location of the subscriber terminal 14 relative to the central terminal 12.

In a similar manner, the effective radiated power from each central terminal 12 may be controlled as a function of the location of the subscriber terminals 14 that are being serviced by the central terminal 12 at any given time. For example, if the majority of active subscriber terminals 14 are located far from the central terminal 12, it may be necessary to increase the power of the signal radiated by the central terminal 12. This may be accomplished by decreasing the number of telecommunications channels that are being transmitted, such as to increase power for the remaining channels, or by increasing the power for certain channels and decreasing the power for other channels. In this manner, the amplification power of the central terminal may be optimized for use in serving the subscriber terminals of the cell.

Figure 2:
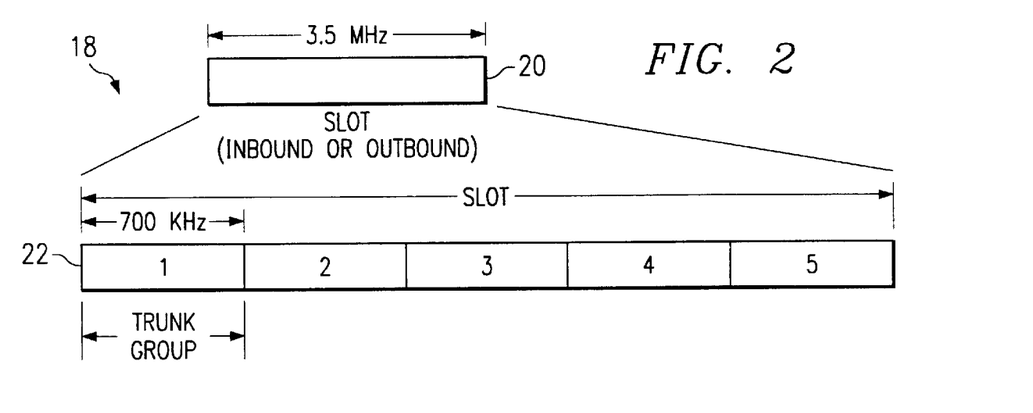
FIG. 2 is a radio spectrum utilization diagram embodying concepts of the present invention.

FIG. 2 is a frequency diagram 18 for a data transmission system in accordance with one embodiment of the present invention. Frequency diagram 18 includes 3.5 MHZ frequency band 20, which is an inbound or outbound radio frequency band modulated by suitable means to occupy a predetermined portion of the radio frequency spectrum. For example, frequency band 20 may be converted to occupy the radio frequency spectrum between 2.259 and 2.2625 gigahertz in an outbound direction from the central terminal 12 to subscriber terminals 14, and to occupy the radio frequency spectrum from 2.434 to 2.4375 gigahertz in an inbound direction from subscriber terminals 14 to the central terminal 12. Alternatively, frequency band 20 may be used in accordance with licensing requirements for any suitable portions of the radio spectrum frequency. Frequency band 20 is used for transmitting data from a transmitter to a receiver. For example, frequency band 20 may be used to transmit data from a single transmitter to a single receiver, from a central transmitter to two or more receivers, or from two or more transmitters to a central receiver.

Frequency band 20 is further divided into one slot of five trunk groups 22, each of which occupy one 700 kHz band of frequency band 20. Each trunk group provides the necessary bandwidth for transmitting telecommunications data by a suitable modulation techniques, such as to a group of subscribers. For example, code division multiple access, time division multiple access, quadrature phase shift keying, or other suitable data transmission techniques may be used alone or in combination to encode and transmit data between the central terminal and the subscriber terminals.

In addition, the use of two or more trunk groups allows a data transmission system utilizing frequency diagram 18 to be easily organized in service areas and classes of service. For example, a predetermined number of trunk groups may be selected for provision of Integrated Service Digital Network service, while other trunk groups may provide dedicated 32,000 bits per second service and 64,000 bits per second service. Alternatively, predetermined trunk groups may provide service to predetermined areas, such that the effective radiated power level of some trunk groups may be increased or decreased to better serve the subscriber terminals in the associated service area. The assignment of trunk groups to service classes or service areas may also be performed dynamically, when service in those classes or service areas are required.

In operation, a data communications system such as system 10 uses the available frequency spectrum in accordance with frequency diagram 18 in order to facilitate communications between a central terminal 12 and a plurality of subscriber terminals 14. The system utilizing frequency diagram 18 may include a single central terminal that is connected to the public switched telecommunications network by copper conductor, optical fiber, radio waves, or other suitable means. The central terminal is connected by radio waves to a suitable number of standby subscriber terminals and to a suitable number of active subscriber terminals for each trunk group 22. By way of example and not by limitation, the central terminal may be connected to 256 standby subscriber terminals and to 28 active subscriber terminals.

The 28 active subscriber terminals may each receive a 32 kilobit per second data stream that is encoded using a suitable wireless data transmission encoding technique, and is transmitted between the central terminal and the active subscriber terminals. Each 700 kHz trunk group 22 operates independently of the other trunk groups 22. This structure allows the number of trunk groups 22 to be increased or decreased as appropriate to accommodate a portion of the radio spectrum allocated by the licensing agency. In addition, the 700 kHz bandwidth may be further divided into sub-carrier bands in order to provide for efficient use of the available amplification power for each 700 kHz band and to improve the efficiency of data transmission in a multi-path environment. Depending upon the data transmission requirements of the wireless communication system, a greater or lesser number of sub-carrier bands may be used.

In addition, each 700 kHz trunk group 22 may be amplified to varying levels or may be modulated to provide varying numbers of telecommunications channels in order to provide additional control for the provision of service to subscriber terminals 14. For example, central terminal 12 may increase the amplification of all channels of certain trunk groups 22 by up to 3 dB by decreasing the amplification of the channels in other trunk groups 22 by 3 dB. An additional 3 dB of gain can also be provided to the channels of predetermined trunk groups 22 by decreasing the number of channels carried per trunk group 22, such as from 32 to 16. The number of channels and amplification power levels of each trunk group 22 may be changed dynamically to provide improved signal quality and service as a function of subscriber access to system 10.

Figures 3A, 3B:
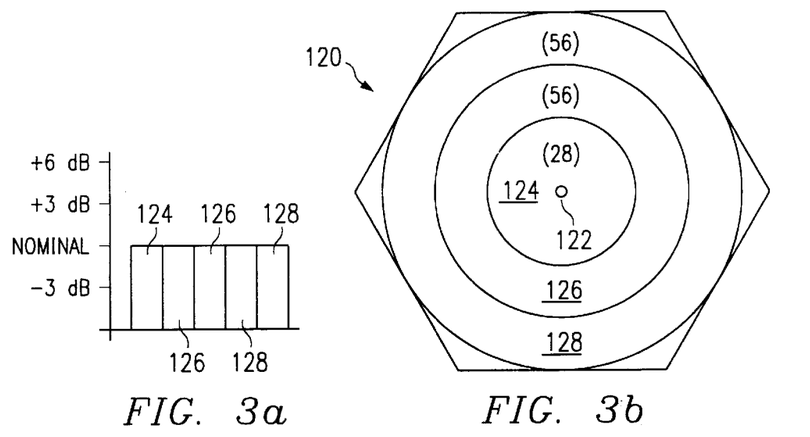
FIG. 3a is a diagram of an exemplary embodiment of power levels for trunk group signals broadcast by a central terminal.
FIG. 3b is a diagram showing trunk group signal usage inside of a service cell in accordance with the exemplary embodiment of the present invention.

FIG. 3a is a diagram of an exemplary embodiment of power levels for channel signals of trunk groups broadcast by a central terminal. All channels of each trunk group have the same nominal power level, such as 35.7 milliwatts. The composite power level for an exemplary trunk group consisting of 28 trunks would thus be one watt. Thus, the subscriber terminals of service area 126 serviced by the central terminal will receive a weaker signal than the subscriber terminals of service area 122 if they are located at a greater distance from the central terminal. Likewise, the subscriber terminals of service area 128 will receive a weaker signal than the subscriber terminals of service areas 122 and 126 if service area 128 is at a greater distance from the central terminal than service areas 124 and 126.

FIG. 3*b* is a diagram showing system usage and available power level adjustments for each trunk group to improve signal quality in accordance with the exemplary embodiment of the present invention shown in FIG. 3*a*. The number of subscriber terminals for service cell 120 with a central terminal 122 and three service areas, 124, 126, and 128, is shown in parentheses, e.g. service area 124 has 28 subscriber terminals.

Cell size is established by the path loss between the central terminal 122 and the subscriber terminals, by the transmit power of a channel signal, and by the minimum level at which the receiver achieves an acceptable bit error rate. This minimum level is known as the receiver threshold. The path loss is affected by environmental factors such as trees and buildings. The transmit power of a channel signal is determined by the power amplifier at the central terminal, which couples the signals for a predetermined number of channels to the antenna. The receiver threshold is related to the receiver design, but may be altered by intefering signals, such as signals generated by neighboring cells. Thus, cell size may be varied by controlling the transmit power of the signal channel.

The total available power for each signal is set by the number of channels and by the maximum power output of the power amplifier. Power can be varied to trunk groups of channels to change the sub-cell service area. In this manner, subscriber terminals that are physically located close to the central terminal may be served by a sub-cell having a smaller service area, while subscriber terminals that are physically located farther away from the central terminal may be served by a sub-cell having a greater service area. In addition, sub-cell size may be varied as a function of subscriber use to improve fade margin and susceptibility to interference. At the limit, the number of sub-cells may be equal to the number of active subscribers being serviced, and amplifier power may be allocated to a subscriber based upon a predetermined level of power for the location of the subscriber, taking into account path loss and variables.

Figures 4A, 4B:
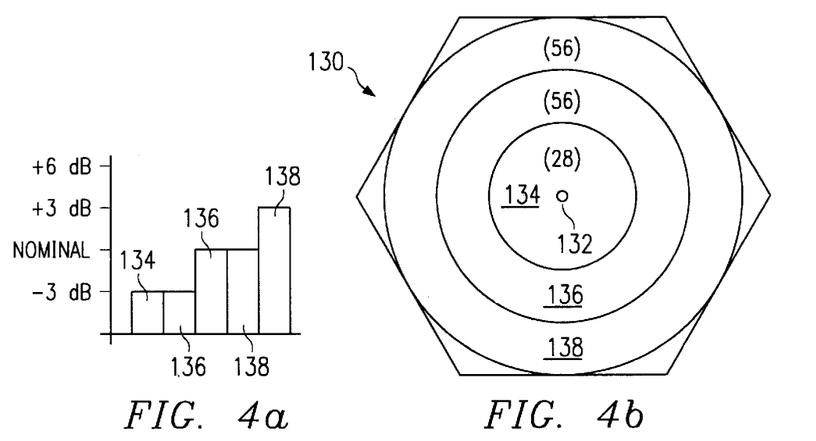
FIG. 4a is a diagram of an exemplary embodiment of power levels for trunk group signals broadcast by a central terminal.
FIG. 4b is a diagram showing trunk group signal usage inside of a service cell in accordance with the exemplary embodiment of the present invention.

FIG. 4*a* shows the associated power level of the trunk group signals broadcast by central terminal for another exemplary embodiment of the present invention. The channel power levels of the trunk group for service area 134 and one of the trunk groups for service area 136 have been decreased by 3 dB, and the power level of one of the trunk groups for service area 136 has been increased by 3 dB. This change in power level in this exemplary embodiment is achieved by decreasing the amplification power for the channels in two trunk groups by a predetermined amount corresponding to 3 dB, and using the surplus power to increase the amplification power for the one increased trunk group by a predetermined amount corresponding to 3 dB. In this manner, the fixed total magnitude of power amplification may be re-allotted between trunk groups to increase the effective range of one trunk group while decreasing the effective range of other trunk groups.

FIG. 4*b* shows exemplary locations of subscriber terminals for a service cell 130 with a central terminal 132 and three service areas, 134, 136, and 138 in accordance with the trunk group power levels shown in FIG. 4*a*. The number of subscriber terminals in each service area is shown in parentheses, e.g. service area 134 has 28 subscriber terminals. Thus, the number and location of subscriber terminals serviced by central terminal 132 is identical to the number and location of subscriber terminals serviced by central terminal 122 of FIG. 3*b*. Nevertheless, the relative size of service cell 130 may be greater than that of service cell 120, as a function of the amplification power used to reach the subscriber terminals that are located within service area 138.

If the service cell is of the same size and has the same geographical features as service cell 120 of FIG. 3*b*, then the subscriber terminals of service area 138 serviced by central terminal 132 receive a stronger signal than subscriber terminals for the corresponding area 128 of the system shown in FIG. 3*b*. Likewise, the 28 subscriber terminals of service area 134 and 28 of the 56 subscriber terminals of service area 136 receive a weaker signal than for the corresponding areas of the system shown in FIG. 3*b*.

The allocation of amplification power shown in FIGS. 4*a* and 4*b* may be used when the signal quality of the signal received at subscriber terminals in service area 138 is worse than the signal quality of the signal received at subscriber terminals in service area 134. Subsequent modifications may likewise be made if the signal quality of the signal received by subscriber terminals in service areas 134 or 136 becomes worse than the signal quality of the signal received by subscriber terminals in service area 138.

Figure 5A:
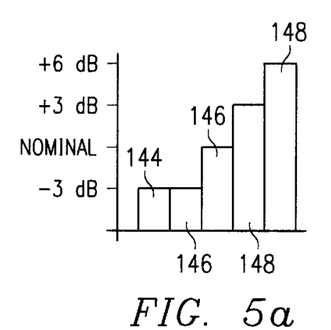
FIG. 5a is a diagram of an exemplary embodiment of power levels for trunk group signals broadcast by a central terminal.

FIG. 5*a* shows yet another exemplary embodiment of the associated power levels for trunk group signals broadcast by a central terminal. The 3 dB increase for the channels of the first trunk group for service area 148 is realized in this exemplary embodiment by decreasing the number of channels serviced by that trunk group from 28 to 14, thus permitting a power increase of 3 dB. The 6 dB increase for the second trunk group for service area 148 is realized in this exemplary embodiment by re-allocating the power from the trunk groups for areas 144 and 146, for a 3 dB gain, and by decreasing the number of channels from 28 to 14 and increasing the power of the remaining channels by 3 dB, for 6 dB of total system gain for the channels.

In this manner, the 28 subscriber terminals of service area 148 serviced by the central terminal receive a stronger signal than for the corresponding areas of the system shown in FIG. 3*b*, assuming identical cell geography. The system for increasing the signal strength of the present invention may also be used to compensate for signal degradation caused by environmental factors, multi-path effects, subscriber terminal locations, or other factors.

Figure 5B:
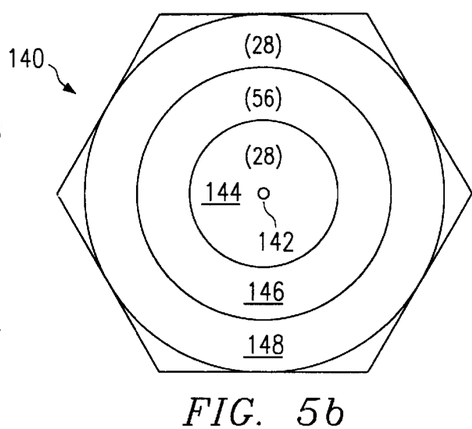
FIG. 5b is a diagram showing trunk group signal usage inside of a service cell in accordance with the exemplary embodiment of the present invention.

FIG. 5*b* shows yet another exemplary embodiment of a service cell 140 with a central terminal 142 and three service areas, 144, 146, and 148. The number of subscriber terminals in each service area is shown in parentheses, e.g. service area 144 has 28 subscriber terminals. Thus, the number and location of subscriber terminals serviced by a central terminal 142 is different from the number and location of subscriber terminals serviced by central terminal 122 of FIG. 3*b* and central terminal 132 of FIG. 4*b*.

FIG. 5*b* is one example of the changes in the number of subscriber terminals over time in each service area that may occur. The present invention allows these changes to be accommodated by re-allocating amplification power and telecommunications channels to trunk groups, such that improved signal quality may be obtained.

The allocation of amplification power shown in FIG. 5*a* may be used when the signal quality of the signal received at subscriber terminals in service area 148 is worse than the signal quality of the signal received at subscriber terminals in service area 144 and 146. Subsequent modifications may likewise be made if the signal quality of the signal received by subscriber terminals in service areas 144 or 146 becomes worse than the signal quality of the signal received by subscriber terminals in service area 148.

In addition to the three exemplary embodiments shown in FIGS. 3a, 3b, 4a, 4b, 5a, and 5b, many other suitable combinations of channels per trunk and amplification power per trunk may be used in order to increase the signal quality of the communications system of the present invention. At the lower limit, a single power level and service area may be designated to simplify tracking and processing of subscriber terminals. At the upper limit, the location of each subscriber terminal may be determined and a corresponding minimum power level may be assigned, such that each subscriber terminal has a dedicated service area. Additional amplification power may be allocated if available to increase signal quality. The number and power levels of the service areas may also be dynamically assigned so as to increase the signal quality for the average subscriber terminal without substantially increasing the administrative requirements for the system that would otherwise be needed if each subscriber terminal had a dedicated service area.

Figure 6:
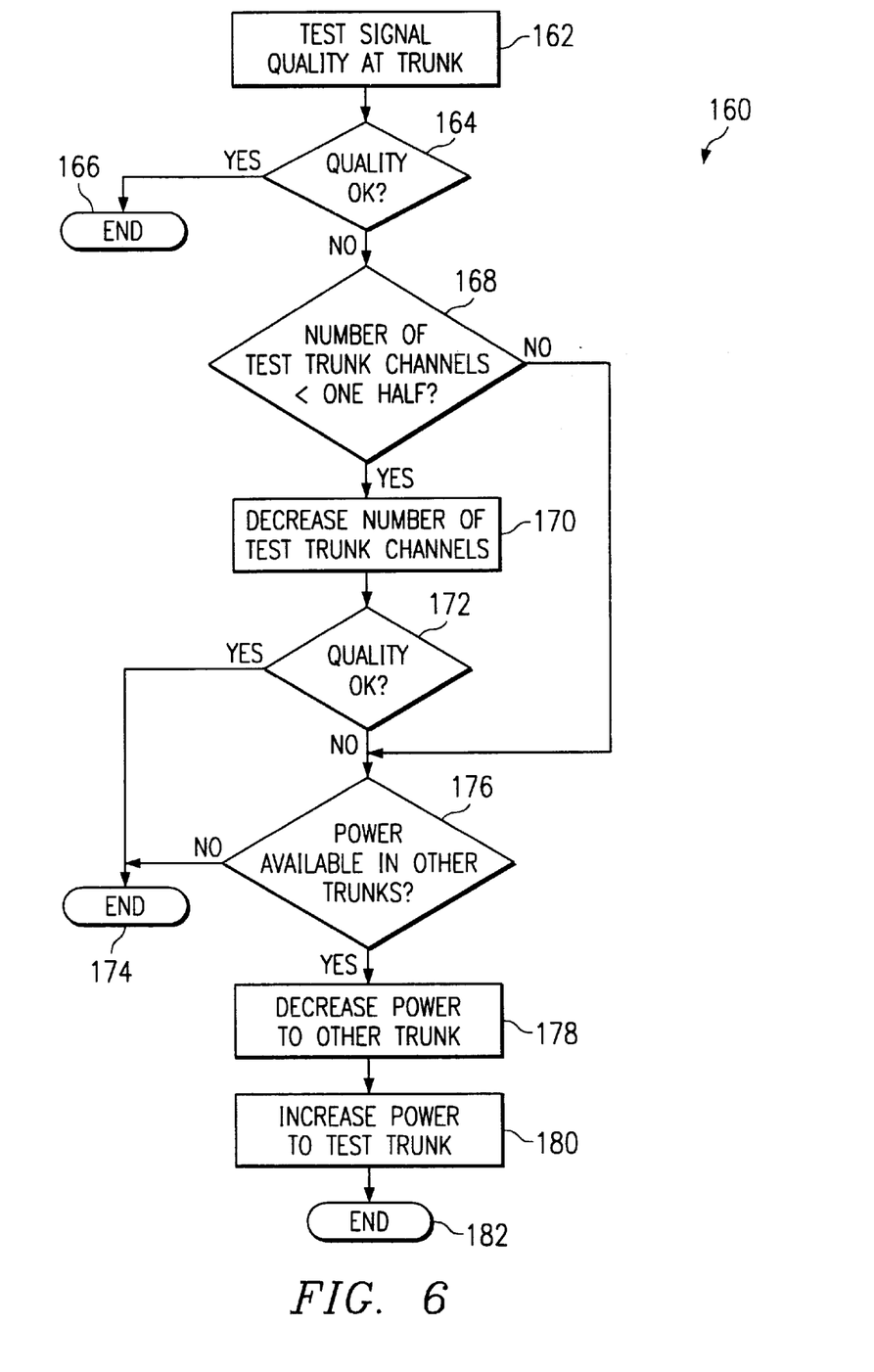
FIG. 6 is a flow chart of a method for providing access to a telecommunications system in accordance with one embodiment of the present invention.

FIG. 6 is a flow chart of a method 160 for providing access to a telecommunications system in accordance with one embodiment of the present invention. Method 160 may be used to test the signal quality of telecommunications channels and to adjust the number of telecommunications channels per trunk group and the amplifier power allocated to one or more trunk groups in order to improve signal quality.

Method 160 begins at 162, where the signal quality of channels in a trunk group is tested at subscriber receivers. If it is determined that the trunk group signal quality is acceptable at step 164, the method terminates at step 166. Otherwise, the method proceeds to step 168.

At step 168, it is determined whether the number of telecommunications channels for the trunk group being tested is less than one-half of the maximum number of allowable telecommunications channels. If the number of telecommunications channels is less than one-half of the maximum, the method proceeds to step 170. At step 170, the number of telecommunications channels for the trunk group being tested is decreased to one-half of the previous value while the composite power level is maintained. For example, if the number of telecommunications channels for the trunk group was 32, it is decreased to 16. The method then proceeds to step 172.

At step 172, it is determined whether the signal quality is acceptable. If the signal quality is acceptable, the method proceeds to step 174 and terminates. Otherwise, the method proceeds to step 176. In addition, if the number of telecommunications channels for the trunk group being tested is determined to be greater than one-half of the maximum allowable number at step 168, the method proceeds directly to step 176.

At step 176, it is determined whether power is available for use in other trunk groups, such as if one of the other trunk groups provides telecommunications channels to subscriber terminals that are physically located close to the central terminal. An example of such subscriber terminals would be those within zones 124, 134, or 144 of FIGS. 3a, 4a, or 5a, respectively. If a trunk group having this characteristic is currently operating at the nominal power level, such as that shown in FIGS. 3b, 4b, and 5b, then the power to that trunk group may be decreased to a level such as the −3 dB level as shown in FIGS. 3b, 4b, and 5b.

At step 178, the amplifier power for the trunk group having surplus power is decreased to the minus 3 dB level. The method then proceeds to step 180, where the extra amplifier power is allocated to the trunk group being tested to increase the signal quality. The method then terminates at step 182.

In operation, the signal quality for the telecommunications channels carried by a trunk group is tested. If the signal quality is acceptable, the method terminates. Otherwise, it is determined whether the number of telecommunications channels for that trunk group may be decreased. If the number of telecommunications channels for the trunk group being tested may be decreased, this is performed, and it is determined whether the signal quality is acceptable. If the signal quality is acceptable, the method terminates.

If the signal quality is not acceptable, or if the number of telecommunications channels for the trunk group being tested cannot be decreased, it is determined whether amplification power is available from other trunk groups. If excess amplification power is available from other trunk groups, the amplification power for those trunk groups is decreased and the amplification power for the trunk group being tested is increased.

The method of FIG. 6 is exemplary, such that any suitable change in amplification power or number of channels may be utilized. Amplification power may be increased or decreased in increments other than +/−3 dB. The number of channels per trunk group may also be increased or decreased by amounts other than a factor of two.

Figure 7:
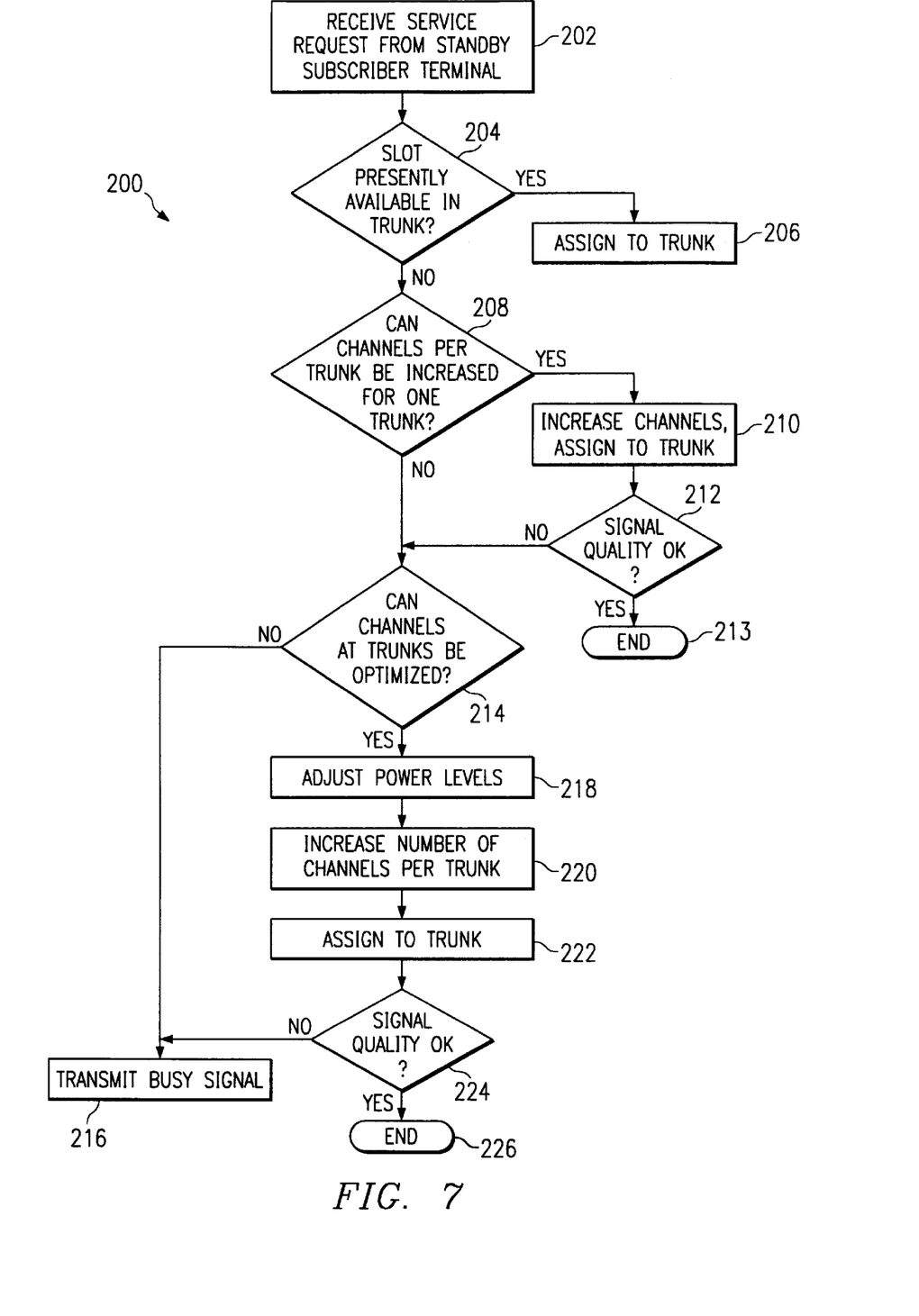
FIG. 7 is a flow chart of a method for providing access to a telecommunications system in accordance with one embodiment of the present invention.

FIG. 7 is a flow chart of a method 200 for providing access to a telecommunications system in accordance with one embodiment of the present invention. Method 200 may be used when a call is placed to or from a standby subscriber terminal.

Method 200 starts at step 202, where a service request is received at a central terminal to place a call to a standby subscriber terminal, or place a call from a standby subscriber terminal. The method then proceeds to step 204, where it is determined whether a telecommunications channel slot is presently available in any of the trunk groups servicing the subscriber terminal. If a telecommunications slot is available, the method proceeds to step 206. At step 206, the call is assigned to the available telecommunications channel slot, and the method terminates.

If a telecommunications channel slot is not presently available, the method proceeds to step 208. At step 208, it is determined whether the telecommunications channels can be increased for one of the trunk groups. For example, one of the trunk groups may be operating at the +6 dB level shown in FIGS. 3b, 4b, or 5b. For trunk groups operating at this level, it is possible to double the number of telecommunications channels with a corresponding decrease in effective radiated power level to +3 dB. This effective radiated power level may be sufficient to overcome any signal quality problems that previously existed and that caused the effective radiated power level to be increased. If a trunk group has this effective radiated power level, the method proceeds to step 210.

At step 210, the number of telecommunications channels for an acceptable trunk group is increased. The standby subscriber terminal is then assigned to one of the additional telecommunications channels slots available on that trunk group. The method then proceeds to step 212, where the signal quality for the telecommunications channels on that trunk group is checked. If the signal quality is determined that it be acceptable, the method proceeds to step 213 and terminates. Otherwise, the method proceeds to step 214.

At step 214, it is determined whether the telecommunications channels for all trunk groups of the system may be optimized. For example, a predetermined period of time may have elapsed since the last time the telecommunications channels for all trunk groups have been optimized. If it is determined that the telecommunications channels for the trunk groups may be optimized, the method proceeds to step 218.

At step 218, the power levels for the trunk groups are adjusted. For example, it may be determined that the subscriber terminals assigned to the telecommunication channels of one trunk group are all physically located close to the central terminal, such as the area shown by service areas 124, 134, and 144 of FIGS. 3a, 4a, and 5a, respectively. The amplification power for a trunk group having this characteristic is decreased to a level corresponding to the −3 dB level of FIGS. 3b, 4b, or 5b. The method then proceeds to step 220. At step 220, the number of telecommunications channels for the trunk group that is currently operating at the +3 dB level shown in FIGS. 3b, 4b, and 5b, is increased. Doubling the number of telecommunications channels for such a trunk group, while keeping the composite power of the trunk group constant, will cause the effective radiated power level of each channel to drop to the nominal level. The amplification power for this trunk group is then increased to bring the effective radiated power level for the trunk group with the increased number of channels to be increased back up to +3 dB. The method then proceeds to step 222.

At step 222, the standby subscriber terminal is assigned to the additional telecommunications channel of the trunk group with the increased number of telecommunications channels from step 220. The method then proceeds to step 224, where the signal quality of all of the effected trunk groups is checked. If it is determined that the signal quality is acceptable, the method proceeds to step 226 and terminates. Otherwise, the method proceeds to step 216.

If it is determined at step 214 that there are no trunk groups that may have optimized telecommunications channels, or if the signal quality of optimized trunk groups is determined to be unacceptable at step 224, The method proceeds to step 216. At step 216, a busy signal is transmitted to the caller. The method then terminates.

The method of FIG. 7 is exemplary, such that any suitable change in amplification power or number of channels may be utilized. Amplification power may be increased or decreased in increments other than +/−3 dB. The number of channels per trunk group may also be increased or decreased by amounts other than a factor of two.

In operation, a call is placed to a standby subscriber terminal or from a standby subscriber terminal, requiring an additional telecommunications channel. If a telecommunications channel is available, the call is assigned to that slot. Otherwise, it is determined whether a trunk group is operating at an effective radiating power level that would allow the number of telecommunications channels to be increased without affecting the power level of other trunk groups. If such a trunk group is available, the telecommunications channels for that trunk group are increased, and the call is assigned to one of the additional telecommunications channels. The signal quality is also checked to verify that an acceptable level of signal quality is available.

If a trunk group is not available with excess power and channel capacity, it is determined whether the amplification power for a trunk group may be decreased and provided to another trunk group such that the number of channels may be increased without a corresponding decrease in signal quality. If this condition exist, the power is reallocated between trunk groups, and the number of telecommunications channels for the other trunk group is increased accordingly. The standby subscriber terminal is then assigned to one of the additional telecommunications channels, and the signal quality is verified to determine whether a decrease in acceptable signal quality has occurred. If the signal quality is determined to be acceptable, the method terminates. Otherwise, a busy signal is transmitted indicating that no available telecommunications channels may be created or assigned to the standby subscriber terminal.

The present invention provides many important technical advantages. One important technical advantage of the present invention is a method for improving the quality of data communications that allows the number of telecommunications channels carried by a trunk group to be dynamically increased and decreased. Another important technical advantage of the present invention is a system for transmitting data that allows the amplification power levels of trunk groups to be dynamically assigned.

Although a particular embodiment has been described herein, it will be appreciated that the invention is not limited thereto and that many modifications and additions thereto may be made within the scope of the invention as defined by the following claims.

What is claimed is:

1. A method for transmitting data comprising:

receiving a service request from a standby subscriber terminal;

changing the amplification power of a trunk group, said trunk group associated with at least two predetermined carrier frequencies;

changing the number of telecommunications channels for the trunk group;

assigning the standby subscriber terminal to one of the telecommunications channels of the trunk group or another trunk group;

wherein said amplification power is changed in relation to the total number of channels in the trunk group.

2. The method of claim 1, wherein changing the number of telecommunications channels for the trunk group comprises increasing the number of telecommunications channels for the trunk group.

3. The method of claim 2 wherein changing the amplification power for the trunk group comprises:

increasing the amplification power for the trunk group.

4. The method of claim 2 wherein changing the amplification power for the trunk group comprises:

decreasing the amplification power for the trunk group.

5. The method of claim 1 wherein changing the number of telecommunications channels for the trunk group comprises decreasing the number of telecommunications channels for the trunk group.

6. The method of claim 5 wherein changing the amplification power for the trunk group comprises:

decreasing the amplification power for the trunk group.

7. The method of claim 5 wherein changing the amplification power for the trunk group comprises:

increasing the amplification power for the trunk group.

8. The method of claim 1 wherein assigning the standby subscriber terminal to one of the telecommunications channels of the trunk group comprises assigning the standby subscriber terminal to one of the telecommunications channels of another trunk group, wherein changing the number of telecommunications channels for the trunk group comprises decreasing the number of telecommunications channels for the trunk group, and wherein changing the amplification power for the trunk group comprises decreasing the amplification power for the trunk group.

9. The method of claim 8 further comprising:

increasing the number of telecommunications channels for the other trunk group.

10. The method of claim 8 further comprising:

increasing the amplification power for the other trunk group.

11. The method of claim 8 further comprising:

increasing the number of telecommunications channels for the other trunk group; and increasing the amplification power for the other trunk group.

12. A system for transmitting data comprising:

a central terminal coupled to a telecommunications network, the central terminal operable to transmit and receive data from the telecommunications network;

a plurality of subscriber terminals, each subscriber terminal operable to transmit and receive a channel of data from the central terminal;

a first trunk group having a first effective radiated power level, the first trunk group modulated by a first group of one or more data channels, wherein the first effective radiated power level may be increased or decreased as a function of the distance between a first group of one or more subscriber terminals and the central terminal, said first trunk group allocated to the central terminal; and a second trunk group having a second effective radiated power level, the second trunk group modulated by a second group of two or more data channels, wherein the second effective radiated power level may be increased or decreased as a function of the distance between a second group of one or more subscriber terminals and the central terminal, said second trunk group allocated to the central terminal.

13. The system of claim 12 wherein the first trunk group and the second trunk group each further comprise a plurality of carriers and wherein the first trunk group is associated with a first type of service, and wherein the second trunk group is associated with a second type of service.

14. The system of claim 12 wherein the first trunk group is modulated by the first group of one or more data channels by modulating each data channel with a code division multiple access code, and the second trunk group is modulated by the second group of one or more data channels by modulating each data channel with a code division multiple access code.

15. The system of claim 12 wherein the sum of the first effective radiated power level and the second effective radiated power level are equal to or less than a predetermined value.

16. The system of claim 12 further comprising one or more additional trunk groups, each additional trunk group having an effective radiated power level, each additional trunk group modulated by an additional group of two or more data channels, wherein the effective radiated power level of each additional trunk group may be increased or decreased as a function of the distance between a second group of one or more subscriber terminals and a central terminal.

17. The system of claim 16 wherein each additional trunk group further comprises a plurality of carriers.

18. The system of claim 17 wherein the sum of each of the effective radiated power levels are equal to or less than a predetermined value.

19. A method for transmitting data comprising:

receiving a service request from a standby subscriber terminal;

changing an amplification level for a trunk group, said trunk group associated with at least two predetermined carrier frequencies;

assigning the standby subscriber terminal to a telecommunications channels of the trunk group; and wherein the total amplification power for the trunk group is a predetermined constant.

20. The method of claim 19 wherein changing the amplification level of the trunk group comprises increasing the amplification level for the trunk group.

21. The method of claim 19 wherein changing the amplification level of the trunk group comprises decreasing the amplification level for the trunk group.

\* \* \* \* \*